United States Patent
Seeger

(10) Patent No.: US 10,029,540 B2
(45) Date of Patent: Jul. 24, 2018

(54) FLUID DELIVERY SYSTEM

(71) Applicant: Caterpillar Inc., Peoria, IL (US)

(72) Inventor: Douglas W. Seeger, Franksville, WI (US)

(73) Assignee: Caterpillar Inc., Deerfield, IL (US)

( * ) Notice: Subject to any disclaimer, the term of this patent is extended or adjusted under 35 U.S.C. 154(b) by 184 days.

(21) Appl. No.: 15/219,120

(22) Filed: Jul. 25, 2016

(65) Prior Publication Data

US 2016/0332509 A1    Nov. 17, 2016

(51) Int. Cl.
| | |
|---|---|
| *F16D 31/02* | (2006.01) |
| *B60H 1/32* | (2006.01) |
| *F04B 9/10* | (2006.01) |
| *E02F 9/20* | (2006.01) |
| *E02F 9/22* | (2006.01) |
| *B60H 1/00* | (2006.01) |
| *F04B 1/29* | (2006.01) |
| *F04B 1/32* | (2006.01) |
| *F04B 17/05* | (2006.01) |
| *F04B 49/20* | (2006.01) |
| *F04B 49/00* | (2006.01) |
| *F03C 1/40* | (2006.01) |
| *E02F 3/30* | (2006.01) |
| *E02F 9/16* | (2006.01) |

(52) U.S. Cl.
CPC ....... *B60H 1/3222* (2013.01); *B60H 1/00378* (2013.01); *B60H 1/00885* (2013.01); *E02F 9/2095* (2013.01); *E02F 9/2235* (2013.01); *E02F 9/2296* (2013.01); *F03C 1/0686* (2013.01); *F04B 1/295* (2013.01); *F04B 1/324* (2013.01); *F04B 9/10* (2013.01); *F04B 17/05* (2013.01); *F04B 49/002* (2013.01); *F04B 49/20* (2013.01); *E02F 3/308* (2013.01); *E02F 9/163* (2013.01); *F04B 2205/09* (2013.01)

(58) Field of Classification Search
CPC ........ F04B 1/295; F04B 1/324; F04B 49/002; F04B 49/08; F04B 49/20; F16H 61/47
USPC .......................................... 60/445, 449, 452
See application file for complete search history.

(56) References Cited

U.S. PATENT DOCUMENTS

| | | | | |
|---|---|---|---|---|
| 5,177,965 A | * | 1/1993 | Nikolaus | ............... F04B 49/106 60/445 |
| 7,305,821 B2 | * | 12/2007 | Kobayashi | .......... F16H 61/4017 60/452 |

(Continued)

FOREIGN PATENT DOCUMENTS

DE    19504918    8/1996

*Primary Examiner* — Michael Leslie

(57) ABSTRACT

A fluid delivery system for an engine is disclosed. The fluid delivery system comprises a pump, a valve module, a motor, and a displacement control module. The pump is operatively coupled with an engine and is adapted to provide a flow of a fluid. The valve module is provided in fluidic communication with the pump to control the flow of the fluid. The motor is provided in fluidic communication with the valve module to receive the flow of the fluid and generate mechanical power. The displacement control module is provided in fluidic communication with the pump and the valve module and is provided downstream of the pump and upstream of the valve module. The displacement control module controls a displacement of the pump for maintaining a constant flow rate of the fluid from the pump based, at least in part, on an engine speed regardless of compressor load.

4 Claims, 3 Drawing Sheets

(56) References Cited

U.S. PATENT DOCUMENTS

2014/0086759 A1    3/2014  Hovel et al.
2016/0340871 A1*  11/2016  Ohkubo ................. F04B 1/324

* cited by examiner

FLUID DELIVERY SYSTEM

TECHNICAL FIELD

The present disclosure relates to a fluid delivery system from an engine. More particularly, the present disclosure relates to the fluid delivery system for operating an accessory associated with the engine.

BACKGROUND

Heavy machines are employed for a variety of tasks in mining, construction, and/or other applications. These machines include, but are not limited to, a hydraulic mining shovel, a hydraulic excavator, or other similar machines. For example, the hydraulic mining shovel includes a cab in which an operator sits to operate the machine. A Heating, Ventilation, Air Conditioning (HVAC) system is utilized in the machine to offer comfortable environment for the operator.

Currently, the HVAC system on the hydraulic mining shovel are hydraulically driven using a load sense system. The load sense system utilizes hydraulic lines coupled with a pump for controlling flow rate to drive a motor. The motor further drives a compressor unit to operate the HVAC system. However, the increased length of these hydraulic lines suffers from delays and inefficiencies for maintaining uniform hydraulic flow rate in a hydraulic circuit. Further, for large machines, the hydraulic lines are even longer which causes further delays and hampers operational efficiency. Moreover, currently there are challenges in maintaining stability of the HVAC system with changing load and motor speed.

However, known solutions may not be efficient, feasible and cost effective in maintaining the constant hydraulic flow rate. Therefore, there is a need for an improved system and method for maintaining a constant hydraulic flow rate irrespective of changing load and motor speed.

SUMMARY OF THE DISCLOSURE

In one aspect of the present disclosure, a fluid delivery system for an engine is disclosed. The fluid delivery system comprises a pump, a valve module, a motor, and a displacement control module. The pump is operatively coupled with an engine and is adapted to provide a flow of a fluid. The valve module is provided in fluidic communication with the pump. The valve module is adapted to control the flow of the fluid. The motor is provided in fluidic communication with the valve module and is adapted to receive the flow of the fluid and generate mechanical power. The displacement control module is provided in fluidic communication with the pump and the valve module. The displacement control module of the pump and upstream of the valve module. The displacement control module is adapted to control a displacement of the pump for maintaining a constant flow rate of the fluid from the pump based, at least in part, on an engine speed regardless of compressor load.

Other features and aspects of this disclosure will be apparent from the following description and the accompanying drawings.

DETAILED DESCRIPTION

Figure 1:
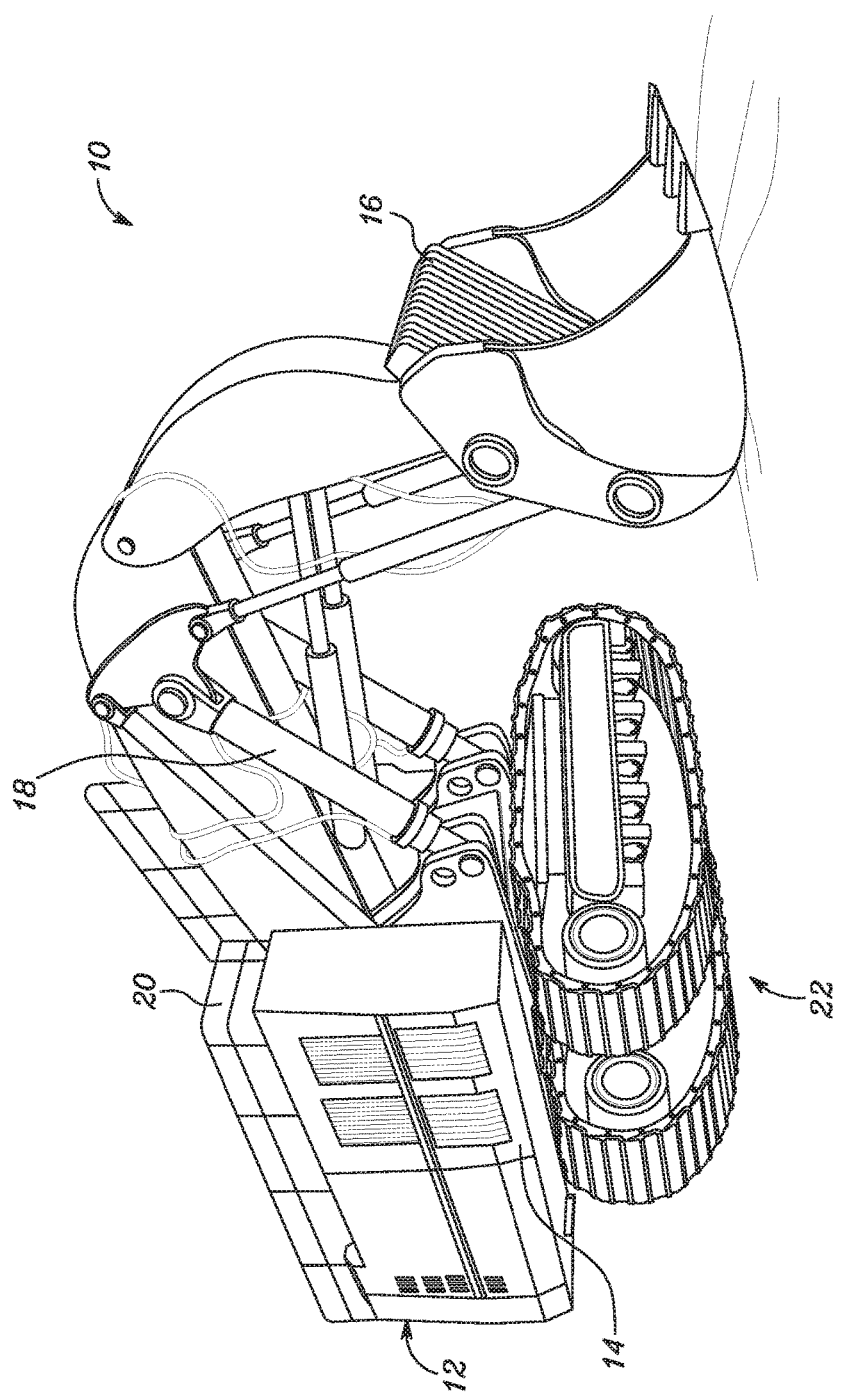
FIG. 1 is a perspective view of an exemplary machine, in accordance with the concepts of the present disclosure.

Referring to FIG. 1, an exemplary machine 10 is illustrated. In an embodiment, the machine 10 is a Hydraulic Mining Shovel (HMS) that is used for digging and extracting coal, rock and/or soil, as examples only, from a worksite. The machine 10 may include a translatable and a rotatable main body 12, which may contain an engine 14, and hydraulic and electrical systems (not shown). The engine 14 is configured to provide power to the machine 10 for performing various operations. The machine 10 may also include a work tool such as, for example, a bucket 16, hydraulic cylinders 18, among others as depicted.

The machine 10 further includes an operator cab 20 that is situated atop of the main body 12. The operator cab 20 may include an operator control station (not shown) of the type in which air-conditioning by way of a Heating, Ventilation, Air Conditioning (HVAC) unit may be desirable. Further, the machine 10 includes an undercarriage system 22 for facilitating movement of the machine 10. The machine 10 may further include various other components that are not labeled in FIG. 1 for the purpose of simplicity. However, the machine 10 may be any other tracked machine such as, but not limited to, a track-type loader, tanks, pipelayers, payers, underground mining equipment, electric rope shovels, and an excavator, without departing from the scope of the disclosure.

Figure 2:
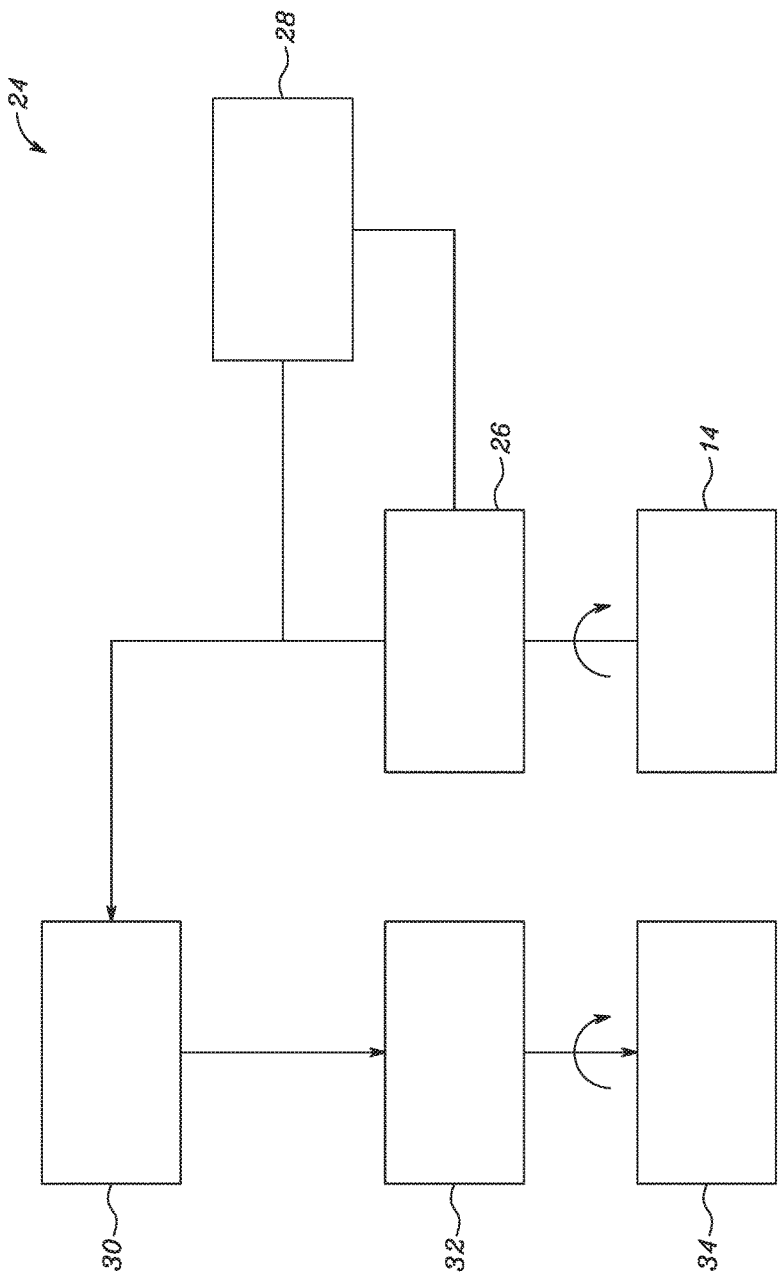
FIG. 2 is a block diagram of a fluid delivery system associated with the machine of FIG. 1, in accordance with the concepts of the present disclosure.

Referring to FIG. 2, a fluid delivery system 24 for the engine 14 is illustrated. The fluid delivery system 24 may be coupled with an electronic control module (ECM) (not shown) that is configured to control various aspects of the fluid delivery system 24, including various hydraulic components associated therewith, as well as related electrical control functions to be further described herein. The fluid delivery system 24 maintains a constant flow rate of a fluid, such as a hydraulic fluid, to a motor 32 for driving a compressor unit 34.

The fluid delivery system 24 includes various components, such as a pump 26, a displacement control module 28, and a valve module 30 in fluidic communication with each other for controlling the constant flow rate of the fluid to the motor 32. The pump 26 is adapted to provide a constant flow of the fluid to the motor 32 by varying its displacement as described in FIG. 3 below.

Figure 3:
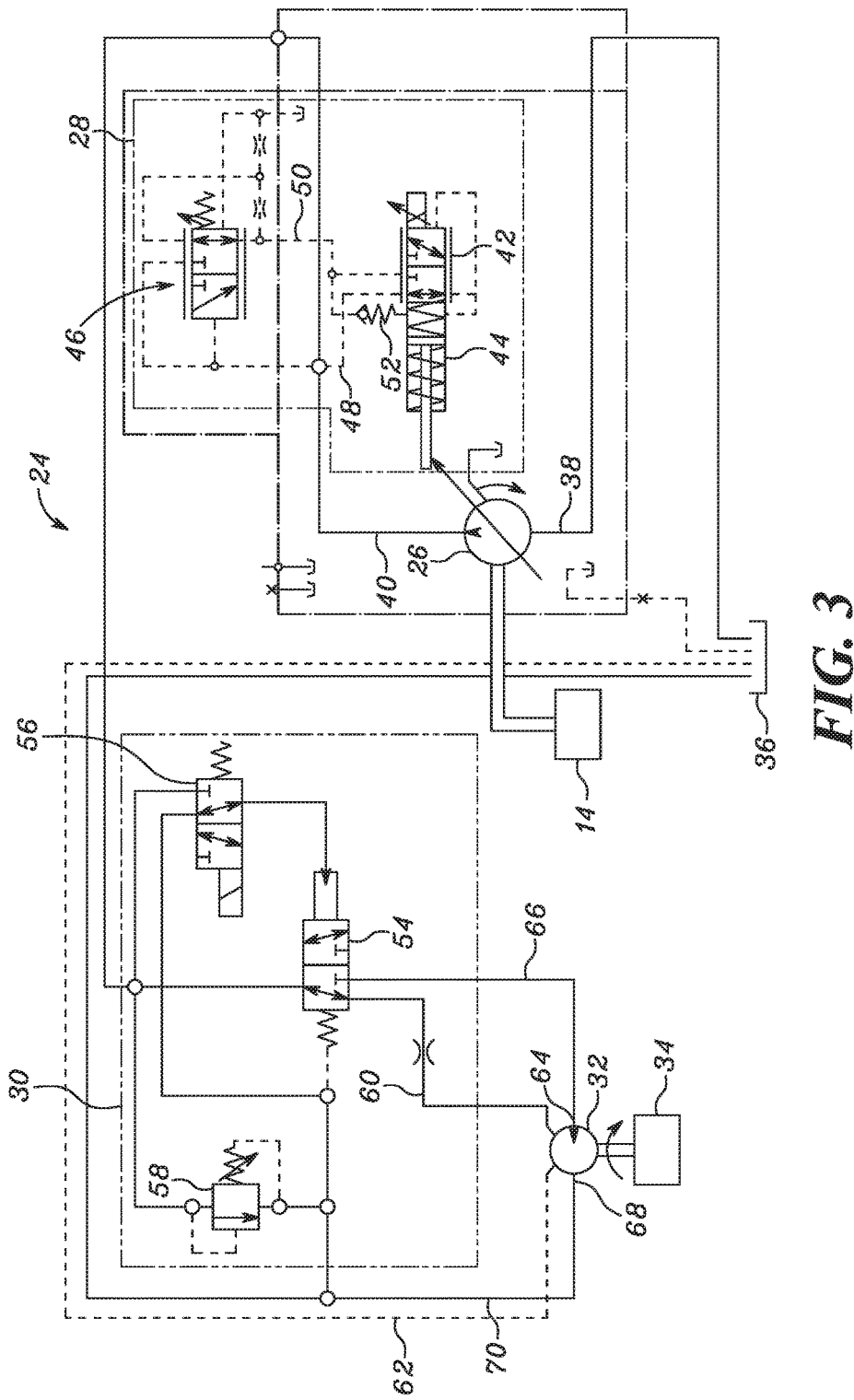
FIG. 3 is a schematic diagram of the fluid delivery system of FIG. 2, in accordance with the concepts of the present disclosure.

Referring to FIG. 3, a schematic diagram of the fluid delivery system 24 is illustrated. The fluid delivery system 24 maintains the constant flow rate of the fluid, such as a hydraulic fluid, to the motor 32 for driving the compressor unit 34. The pump 26 is operatively coupled with the engine 14 for receiving power and is adapted to provide the flow of the fluid to the motor 32. In an embodiment, the pump 26 is a positive displacement pump and is adapted to vary its displacement using the displacement control module 28 for maintaining the constant flow rate of the fluid on downstream side of the pump 26. The ECM may be adapted to control the displacement control module 28 for maintaining the constant flow rate of the fluid to control the speed of the motor 32. The displacement control module 28 is adapted to modulate a piston assembly 44 to vary the displacement of the pump 26 in accordance with the engine speed and engine load in order to maintain the constant flow rate to the motor 32. The constant flow rate facilities to maintain a constant speed for the motor 32 that in turn drives the compressor unit 34.

The pump 26 is adapted to draw the fluid from a reservoir 36 (see FIG. 3). The reservoir 36 holds sufficient fluid to meet demands of the pump 26 and other hydraulic components of the fluid delivery system 24. The hydraulic fluid is received from the reservoir 36 into the pump 26 via an inlet 38 and is supplied to the motor 32 via an outlet 40 as described below.

The pump 26 is operated directly by the engine 14 of the machine 10. It will be apparent to one skilled in the art that the pump 26 may receive power from other sources and h any other mechanism not described herein without departing from the meaning and the scope of the disclosure. During operations of the machine 10, the engine speed and engine load may vary as the power from the engine 10 is varied due to some other auxiliary operations. As a result, the input power received by the pump 26 may tend to vary.

Therefore, in order to maintain the constant flow rate of the fluid in the fluid delivery system 24, the displacement control module 28 is adapted to control the displacement of the pump 26 for maintaining the constant flow rate of the fluid from the pump 26 based, at least in part, on the engine speed and the engine load. For example, if there is any slight variation in the input power from the engine 14 to the pump 26, the pump 26 still maintains the constant flow rate of the fluid on its downstream side via the outlet 40 using the displacement control module 28 as described in subsequent paragraph.

The displacement control module 28 is in fluidic communication with the pump 26 and the valve module 30. The displacement control module 28 is provided downstream of the pump 26 and upstream of the valve module 30 for modulating the displacement of the pump 26 in accordance with the variation in the engine speed and the engine load. The displacement control module 28 includes a modulating valve 42 and the piston assembly 44 provided downstream of the pump 26.

The displacement control module 28 further includes a proportional valve 46 provided downstream of the modulating valve 42 and upstream of the valve module 30. The proportional valve 46 is configured to control the maximum system pressure supplying the modulating valve 42 in order to control the flow rate of the fluid into the piston assembly 44. The modulating valve 42 is operated in such a manner that if there is no requirement of displacement actuation of the piston assembly 44, the fluid is returned back to the reservoir 36 via a path 50. Else, if there is a requirement of displacement actuation of the piston assembly 44, the fluid is routed to the modulating valve 42 via a path 48.

The displacement control module 28 further includes a check valve 52 provided downstream of the modulating valve 42 and the piston assembly 44. The check valve 52 is in fluidic communication with the modulating valve 42 and the piston assembly 44 to maintain hydraulic pressure in the displacement control module 28 within safety limits. The working of the displacement control module 28 is described in subsequent paragraph.

During operations, if there is a variation in the power from the engine 14, the modulating valve 42 is adapted to proportionately activate the piston assembly 44 to vary the displacement of the pump 26 in order to maintain the constant flow rate of the fluid downstream of the pump 26. It will be apparent to one skilled in the art that the displacement of the pump 26 may be varied using any other techniques without departing from the meaning and the scope of the disclosure.

The motor 32 is in fluidic communication with the valve module 30 and is adapted to receive the fluid from the pump 26 to generate mechanical power. The motor 32 is positioned downstream of the valve module 30 and the pump 26. The motor 32 is adapted to receive the constant flow rate of the fluid for generating the mechanical power that runs the compressor unit 34. The compressor unit 34 is associated with the HVAC unit. In an embodiment, the motor 32 is a fixed displacement motor, any displacement modulation of the pump 26 as directed by the ECM may cause the pump 26 to supply the constant flow rate of the fluid to the motor 32 in order to drive the compressor unit 34.

The valve module 30 is in fluidic communication with the pump 26 and is downstream of the pump 26 to control the flow of the fluid. The valve module 30 includes a directional valve 54, a solenoid valve 56 and a relief valve 58. The directional valve 54 is provided upstream of the motor 32. The solenoid valve 56 is provided upstream of the directional valve 54 and downstream of the displacement control module 28. The relief valve 58 is provided upstream of the directional valve 54 and downstream of the displacement control module 28 and is parallel with respect to the solenoid valve 56.

The relief valve 58 is in fluidic communication with the directional valve 54, and the solenoid valve 56 to maintain hydraulic pressure in the fluid delivery system 24 within safety limits. The directional valve 54 and the solenoid valve 56 are in fluidic communication and operatively coupled with each other to control the flow rate of the fluid to the motor 32 as described in subsequent paragraph. It will be apparent to one skilled in the art that the valve module 30 may use other techniques or components for controlling flow rate of the fluid not described herein.

During operations, the solenoid valve 56 drives the directional valve 54 for turning the motor 32 on/off. When the solenoid valve 56 is not energized, the directional valve 54 is turned off. Under this condition, a small amount of fluid (i.e. oil) is passed through the directional valve 54 via a path 60 and flushes through a case of the motor 32 and then back to the reservoir 36 via a path 62. This operation keeps the motor 32 at an operating oil temperature so that there is no thermal shock to the motor 32, when the motor 32 is turned on.

When the solenoid valve 56 is energized, the directional valve 54 is operated in such a way that the fluid is passed to an inlet 64 through a path 66 to turn the motor 32 on. As a result, the valve module 30 is able to maintain the flow of the fluid to operate the motor 32 and the fluid is returned back to the reservoir 36 through an outlet 68 of the motor 32 via a path 70. As a result, the motor 32 supplies a constant speed to the compressor unit 34 irrespective of any variation in the engine speed or compressor load. The compressor unit 34 is further associated with the HVAC unit for controlling temperature inside the operator cab 20 of the machine 10.

INDUSTRIAL APPLICABILITY

The proposed disclosure utilizes the displacement control module 28 for varying the displacement of the pump 26 based on the engine speed in a real-time manner in order to maintain a constant output speed from the motor 32. The displacement control module 28 may be easily configured by integrating the modulating valve 42 for maintaining the constant flow rate of the fluid from the pump 26 to the motor 32. As a result, there is no requirement for additional complex load sensing circuitries that suffers from delays and inefficiencies in the fluid delivery system 24.

The proposed disclosure may be easily retrofitted in other large work machines, particularly hydraulic powered work machines, such as mining shovels, mining trucks, excavators, and the like. The proposed disclosure may offer greater reliability and efficiency for the HVAC system that result in fewer downtime periods for maintenance and/or replacement of various parts of the HVAC system. Further, the disclosure offers a fast, reliable, and stable control mechanism for operating the HVAC system of the operator cab 20 and the increased stability increases life and performance of the compressor unit 34.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fluid delivery system for an engine, the fluid delivery system comprising:
    a pump operatively coupled to the engine, the pump adapted to provide a flow of a fluid;
    a valve module provided in fluidic communication with the pump, the valve module adapted to control the flow of the fluid;
    a motor provided in fluidic communication with the valve module, the motor adapted to receive the flow of the fluid and generate mechanical power; and
    a displacement control module provided in fluidic communication with the pump and the valve module, the displacement control module provided upstream of the valve module, the displacement control module adapted to control a displacement of the pump for maintaining a constant flow rate of the fluid from the pump based, at least in part, on an engine speed regardless of a compressor load.

2. The fluid delivery system of claim 1, wherein the displacement control module includes:
    a modulating valve controlling the pump; and
    a proportional valve provided downstream of the modulating valve and upstream of the valve module.

3. The fluid delivery system of claim 1, wherein the valve module includes:
    a directional valve provided upstream of the motor;
    a solenoid valve provided upstream of the motor and downstream of the displacement control module; and
    a relief valve provided upstream of the directional valve and downstream of the displacement control module and parallel with respect to the solenoid valve.

4. The fluid delivery system of claim 1, wherein the motor is further coupled to a compressor associated with a Heating, Ventilating and Air Conditioning (HVAC) unit.

\* \* \* \* \*